US006360327B1

(12) United States Patent
Hobson (10) Patent No.: US 6,360,327 B1
(45) Date of Patent: Mar. 19, 2002

(54) SYSTEM WITH CONTROL REGISTERS FOR MANAGING COMPUTER LEGACY PERIPHERAL DEVICES USING AN ADVANCED CONFIGURATION POWER INTERFACE SOFTWARE POWER MANAGEMENT SYSTEM (75) Inventor: Louis B. Hobson, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/267,554

(22) Filed: Mar. 12, 1999

(51) Int. Cl.[7] .............................. G06F 1/26; G06F 1/28; G06F 1/30; G06F 3/00
(52) U.S. Cl. ........................ 713/300; 713/320; 713/330; 710/15; 710/18
(58) Field of Search ................................ 710/8, 15, 18; 713/300, 320, 323, 324, 330

(56) References Cited

U.S. PATENT DOCUMENTS

| 5,517,646 | A | * | 5/1996 | Piccirillo et al. ............... 713/1 |
| 5,878,264 | A | * | 3/1999 | Ebrahim ..................... 713/323 |
| 5,919,264 | A | * | 7/1999 | Reneris ...................... 713/324 |
| 6,065,067 | A | * | 5/2000 | Hobson et al. ................. 710/8 |
| 6,065,121 | A | * | 5/2000 | Hobson et al. ............. 713/300 |
| 6,081,901 | A | * | 6/2000 | Dewa et al. ................ 713/300 |
| 6,092,208 | A | * | 7/2000 | Reneris ...................... 713/323 |
| 6,105,142 | A | * | 8/2000 | Goff et al. .................. 713/324 |
| 6,122,748 | A | * | 9/2000 | Hobson ....................... 713/323 |
| 6,199,134 | B1 | * | 3/2001 | Deschepper et al. ......... 710/129 |
| 6,266,776 | B1 | * | 7/2001 | Sakai .......................... 713/300 |
| 6,272,642 | B2 | * | 8/2001 | Pole, II, et al. ............. 713/300 |

* cited by examiner

Primary Examiner—Thomas Lee
Assistant Examiner—Chun Cao
(74) Attorney, Agent, or Firm—Conley, Rose & Tayon, P.C.

(57) ABSTRACT

A computer system permits the use of a software-based power management system, such as ACPI, while maintaining compatibility with legacy peripherals. The computer system utilizes a sleep register and a decoy register that receive sleep requests from the operating system. The sleep type bits transmitted to the sleep register are configured to allow the computer system to remain in fully operational mode, and only the decoy register receives the correct sleep type bits from a sleep request. When a sleep enable bit in the decoy register is set by a sleep request, an SMI is generated to run an interrupt service routine to perform any desired configuration routines prior to sleep mode. The interrupt service routine then writes the true sleep type bits to the sleep register, placing the computer system into sleep mode. The sleep enable bit resides in the highest byte of the decoy register so that byte-wide write operations do not trigger the SMI before the entire 16-bit sleep request is received.

46 Claims, 4 Drawing Sheets

SYSTEM WITH CONTROL REGISTERS FOR MANAGING COMPUTER LEGACY PERIPHERAL DEVICES USING AN ADVANCED CONFIGURATION POWER INTERFACE SOFTWARE POWER MANAGEMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems and particularly to power management in a personal computer system. More particularly, the present invention relates to configuring legacy peripheral devices for low-power mode using a software-based power management system.

2. Background of the Invention

Many personal computer systems conserve energy by operating in special low-power modes when the user is not actively using the system. Although used in desktop and portable systems alike, these reduced-power modes particularly benefit laptop and notebook computers by extending the battery life of these systems. Some computer systems automatically enter low-power mode when a user has not performed a certain action within a given period of time. The computer might power down the monitor if the video display has not recently changed, for example, or may power down the hard drive if the user has not recently opened or saved any files onto the hard disk. If the computer detects a period of inactivity, the computer may enter a deep "sleep" mode in which power is completely cut off to all but a few devices within the computer. In addition, the user often can initiate the sleep mode through a menu in the operating system (OS) or by pressing a power button on the computer. Because the computers random access memory (RAM) remains powered on during sleep mode, the memory contents are preserved so that the computer returns to the same state that it was in when the sleep mode began.

Although these reduced-power modes may render the computer temporarily or partially inoperable, the user can generally restore full-power, or "wake up," the computer at any time. For example, the computer may automatically restore video power if the user moves the mouse or presses a key on the keyboard, or might power up the hard disk if the user attempts to open or save a file. Many computer systems include a power button that the user can press to wake up the machine from sleep mode. In addition, some computers have the capability to wake automatically in response to incoming phone calls detected by a modem or to wakeup messages received over a local area network (LAN). Sleep mode is often an attractive alternative to completely shutting the computer down, because the computer consumes little power during sleep mode and because waking up from sleep mode typically is much faster than rebooting the system.

Early implementations of the various power modes required the computer hardware itself to monitor user activity and determine the proper power state for each device in the computer system. These early computer systems included a read only memory (ROM) device that stored a set of instructions for the computer to follow in order to carry out power management functions. The set of instructions formed part of the Basic Input/Output System (BIOS) of the computer, which also included instructions for procedures such as accessing data on a hard or floppy disk drive and controlling the graphics display. The ROM device containing the BIOS is referred to as the "BIOS ROM." Because hardware-based power management instructions usually are included in BIOS, such a management scheme is commonly known as "BIOS power management." Under BIOS power management, conditions within the computer system that initiate power state transitions, such as button presses and periods of inactivity explained above, generate system management interrupt (SMI) signals to the central processing unit (CPU). Upon receiving an SMI, the CPU executes the BIOS power management instructions stored in ROM to change the power state.

More recently, the Advanced Configuration and Power Interface (ACPI) specification, written collaboratively by Intel, Microsoft, and Toshiba, has introduced the concept of managing power functions using the computer's operating system software (e.g., Windows® 98 and Windows® NT). Centralizing power management within the operating system, in contrast with earlier hardware-based power management techniques, allows computer manufacturers to make simpler, less expensive hardware components that do not have to manage their own power states. Instead, these devices need only to respond to power management commands from the operating system. In general, operating system-based power management enables the computer system to implement relatively complex power management procedures that may have been difficult, if not impossible, to realize using a more decentralized, hardware-based approach. In fact, implementing power control through ACPI, instead of through traditional hardware methods, can significantly reduce the power consumption of some computer systems. Operating system-based power management also provides the user with some level of power management control.

Under ACPI, a computer system can operate in one of six system power states, S0, S1, S2, S3, S4, and S5, which encompass varying levels of system activity ranging from fully operational (S0) to "soft off" (S5). Power states S1–S5 represent sleeping states, in which the computer system is neither fully operational nor completely powered off. The sleep states generally encompass varying levels of system activity (or "context") and require different lengths of time (or "wakeup latencies") to return to full power. Because sleep state S5 represents the deepest sleep state, it may also be referred to equivalently as the "off" state or as the lowest-power state.

Transitioning between the system power states generally requires cooperation between the operating system and the computer hardware. The computer provides a set of ACPI registers which the operating system can access. To transition to one of the sleep modes from full-power mode (S0), the operating system stores special sleep codes into a pair of ACPI control registers. The control registers are known as the PM1a and PM1b Control Registers, and each sleep code includes a sleep enable bit and three sleep-type bits. The sleep-type bits generally identify one of the power states S1–S5. Upon detecting that the operating system has set (or "asserted") the sleep enable bit, the computer places itself into a sleep mode as defined by the sleep-type bits.

As stated above, the operating system may direct the hardware to place itself into a sleep mode for a variety of reasons. For example, the computer hardware may provide a timer that expires after a predetermined time of inactivity within the system, prompting the OS to place a sleep request into the sleep-type and sleep enable bits of the control register. Alternatively, the operating system may write a sleep request to the control register after detecting that the user has initiated a sleep mode through the software interface, pressed sleep button on the computer chassis, or simply closed the computer screen (e.g., on a laptop computer). When the sleep enable bit of the control register is asserted, the computer system places itself into the low-power mode indicated by the value of the sleep-type bits.

The ACPI protocol also includes a status register to enable system wakeup. The status register, known as the PM1 Status Register, includes a wake status bit. The wake status bit typically is set if the user presses a wakeup button or power button on the computer. Certain devices in the computer system, such as the modem or network interface card (NIC), also may cause the wake status bit to be set in response to incoming messages (e.g., phone rings or network "wakeup" messages). When the operating system detects that the wake status bit has been set, the operating system transitions computer operation to the S0 mode.

Figure 1:
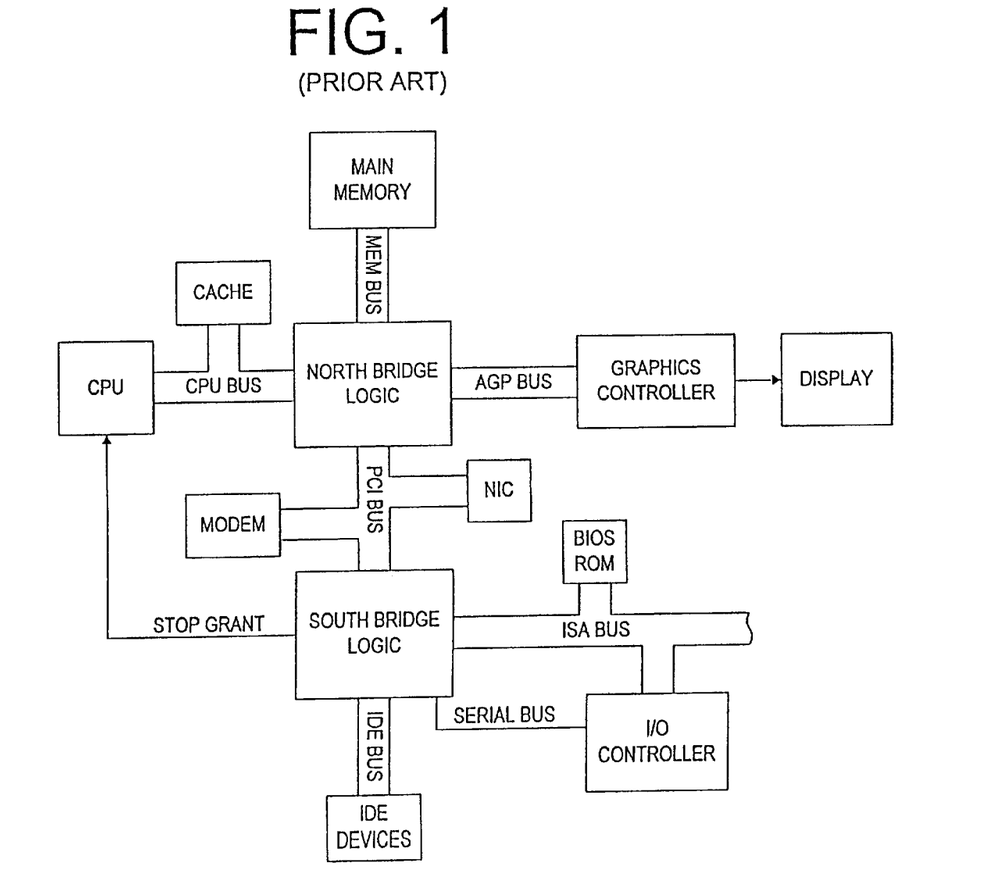
FIG. 1 illustrates a conventional personal computer system.

To more clearly illustrate transitions between the power modes, FIG. 1 shows a representative conventional computer system that generally includes a CPU, a main memory array, and a bridge logic device coupling the CPU and main memory. The bridge logic device is sometimes referred to as a "North bridge" for no other reason than it often is depicted at the upper end of a computer system drawing. The North bridge couples the CPU and memory to the peripheral devices in the system through a Peripheral Component Interconnect (PCI) bus or other expansion bus, such as an Extended Industry Standard Architecture (EISA) bus. Various peripheral devices that implement the PCI protocol may reside on the PCI bus, as well. For example, a modem and network interface card (NIC) are shown coupled to the PCI bus in FIG. 1. The modem generally allows the computer to communicate with other computers over a telephone line, an Integrated Services Digital Network (ISDN), or a cable television connection, while the NIC permits communication between computers over a local area network (LAN) (e.g., an Ethernet network). The North bridge logic also may provide an interface to an Advanced Graphics Protocol (AGP) bus that supports a graphics controller to drive a video display. If the computer system does not include an AGP bus, the graphics controller may reside on the PCI bus.

If other secondary expansion buses are provided in the computer system, another bridge logic device typically couples the PCI bus to that expansion bus. This bridge logic is sometimes referred to as a "South bridge," reflecting its location vis-à-vis the North bridge in a typical computer system drawing. In FIG. 1, the South bridge couples the PCI bus to an Industry Standard Architecture (ISA) bus and to an Integrated Drive Electronics (IDE) bus. The IDE bus typically interfaces input and output devices such as a CD ROM drive, a Digital Video Disk (DVD) drive, a hard disk drive, and one or more floppy disk drives. Various ISA-compatible devices are shown coupled to the ISA bus, including a BIOS ROM. As noted above, the BIOS ROM is a memory device that stores commands that instruct the computer how to perform basic functions such as sending video data to the display or accessing data on hard and floppy disk drives. In addition, the BIOS ROM may be used to store power management instructions for hardware-based (or "legacy") power management systems. The BIOS instructions also enable the computer to load the operating system software program into main memory during system initialization, also known as the "boot" sequence. The BIOS ROM typically is a "nonvolatile" memory device, which means that the memory contents remain intact even when the computer powers down. By contrast, the contents of the main memory typically are "volatile" and thus are lost when the computer shuts down.

The South bridge may also support an input/output (I/O) controller that interfaces to basic input/output devices (not shown) such as a keyboard, a mouse, a floppy disk drive, and various input switches such as a power switch and a sleep switch. The I/O controller typically couples to the South bridge via a standard bus, shown as an ISA bus in FIG. 1. A serial bus, which generally is a bus with only one data signal, may provide an additional connection between the I/O controller and South bridge. The I/O controller typically includes an ISA bus interface (not specifically shown) and transmit and receive registers (not specifically shown) for exchanging data with the South bridge over the serial bus.

Under hardware-based power control, the I/O controller generally handles some power management functions such as reducing or terminating power to components such as the floppy drive (not shown), gating the clock signals that drive components such as the bridge devices and CPU, and initiating sleep mode transitions on the peripheral buses. The I/O controller further asserts SMI signals (not shown) to the CPU in response to certain input signals, for example a signal from the power button to wake the computer from sleep mode. The I/O controller typically incorporates a counter or a Real Time Clock (RTC) to track the activities of certain components such as the hard drive and the PCI bus, inducing sleep mode after a predetermined time of inactivity.

Under the ACPI protocol, however, the South bridge or other component within the computer system typically manages power functions under the direction of the operating system. In the system illustrated in FIG. 1, for example, the South bridge provides a STOP GRANT signal to the CPU capable of halting CPU operation. Accordingly, the South bridge may assert the STOP GRANT signal when placing the computer into a sleep mode. The BIOS ROM stores the address locations of the ACPI registers in tabular form, and the operating system reads the ACPI table from the BIOS ROM during the computer boot sequence. The South bridge may contain some, or all, of the ACPI registers. For example, the BIOS ROM may define the PM1 Status and Control Registers as registers within the South bridge. Thereafter, the operating system uses these registers for ACPI power management. To place the computer in sleep mode, for instance, the operating system writes a sleep message to the PM1$a$ and PM1$b$ Control Registers. One or both of these registers may reside in the South bridge. As explained above, the sleep messages include sleep codes identifying one of the sleep modes (S1–S5) for the sleep-type bits and logical "one" values for the sleep enable bits to trigger a change to sleep mode. The ACPI table defines the sleep codes for the PM1$a$ and PM1$b$ registers, and the sleep codes for the PM1$a$ register are defined independently of the sleep codes for the PM1$b$ register. Upon detecting that the operating system has set the sleep enable bit, the South bridge immediately places the computer system into the appropriate sleep mode. When a wakeup event occurs, the South bridge wakes the computer system, sets the wake status bit in the PM1 Status Register, and transmits a system control interrupt (SCI) to notify the operating system that fall-power mode has resumed.

Even while the computer is in sleep mode, it may be desirable to maintain just enough activity in the modem and/or NIC to allow these devices to monitor for incoming messages and wake the computer when necessary. For instance, some computers include voice mail, fax, and/or remote communications software programs that answer incoming telephone calls. While the computer is asleep, the modem must be able to monitor the telephone line and wake up the computer if the phone line rings. The computer can then answer the phone call. Similarly, the NIC occasionally may receive "wakeup" messages over the network, such as when a remote user attempts to access the sleeping computer. If the NIC detects such a message, it should be capable of waking the computer to respond to the message. Accordingly, the modem or NIC may command the South bridge to bring the computer out of sleep mode and set the wake status bit.

Providing peripheral devices such as a modem or NIC with the capability to monitor for incoming messages while the computer is asleep and to wake the computer system when necessary, however, can create numerous difficulties if the peripheral devices are not designed to comply with the ACPI protocol. Typically, these peripheral devices, which are referred to as "legacy" peripheral devices, require special configuration sequences before sleep mode begins in order to begin monitoring for incoming communications. If a legacy device is simply placed into sleep mode without the proper configuration sequence, then the device may not be capable of detecting incoming messages. ACPI requires the operating system to prepare for sleep mode before the sleep enable bit is set, however, and with operating system resources prepared for sleep mode after setting the sleep enable bit, no operating system routines are available to perform the necessary legacy device configuration sequences. Thus, legacy peripheral devices operating under ACPI cannot return the computer system to full-power mode in response to incoming wakeup messages, since prior to entering sleep mode, the OS was not able to configure the devices. As a consequence, computer users that rely on these legacy peripheral devices may not be able to successfully upgrade to future computer systems that use ACPI power management.

For the foregoing reasons, an ACPI-compliant computer system that can configure legacy devices for sleep mode after the operating system initiates a sleep mode would greatly improve computer system operation. Despite the apparent advantages that such a system would provide, to date, no such device has been developed that provides this feature.

SUMMARY OF THE INVENTION

Accordingly, the present invention discloses a computer system that is configured to implement a software-based power management system, thereby allowing more elaborate and efficient power management functions than were possible under hardware-based power management. At the same time, the computer system flexibly permits hardware-based configuration of legacy peripherals and other devices within the computer that are not configurable through software-based power management. Conventional computers running under the ACPI power management protocol include special control registers (i.e., the PM1*a* and PM1*b* Control Registers) that, when written to by the operating system, initiate the transition to a low-power mode in the computer system. The computer system of this disclosure incorporates a power management circuit that comprises a "decoy" register, a "sleep" register, interrupt generation circuitry, and circuitry to control the power state within the computer system.

The sleep register serves as the ACPI PM1*a* Control Register, and the decoy register serves as the ACPI PM1*b* Control Register. The decoy and sleep registers thus are constructed substantially according to the architecture of the PM1 Control Register as defined in the ACPI Specification, version 1.1, and incorporate the bit definitions of the PM1 Control Register including, in particular, the sleep enable bits and the sleep codes that comprise the ACPI sleep type bits. The computer system relies on the sleep register to determine the appropriate power state. Based on the power state, as defined by the sleep type bits in the sleep register, the power management circuit controls the computer system power mode. If the PM1*a* sleep enable bit is set, then the computer transitions to the power mode defined by the PM1*a* sleep type bits. Because the operating system writes to the PM1*a* and PM1*b* registers at the same time under ACPI, the decoy register (i.e., the PM1*b* register) receives sleep requests as well.

To allow the computer to configure peripheral devices before changing power states, the ACPI table in BIOS defines the sleep codes for the PM1*a* (sleep) register to have the same values. All of the PM1*a* sleep type codes are set to a value that represents a fully operating mode. In a preferred embodiment, the PM1*a* sleep codes represent the S0 code which represents the fully operational ACPI power state. As a result, sleep requests from the operating system write the S0 code into the sleep register, no matter which sleep state the operating system intended to request.

In contrast, the ACPI table defines the true sleep type codes for the PM1*b* (decoy) register, so that the decoy register receives sleep codes that represent the power state that the operating system actually intended to request. If the sleep request sets the PM1*b* sleep bit to initiate the sleep mode indicated by the PM1*b* sleep type bits, then the computer responds by configuring the peripheral devices for the appropriate sleep mode. Setting the sleep enable (SLP_EN) bit in the decoy register generates an SMI to notify the microprocessor that the operating system placed a sleep request. The sleep enable bit preferably is located in the highest byte of the decoy register so that an SMI is triggered only when data is written to the highest byte. Because the operating system may write data to the register in 8-bit segments, starting with the lowest byte of the register, placing the sleep enable bit in the highest register prevents 8-bit writes from initiating sleep mode before the entire data word (16 data bits) is written to the highest byte.

In response to the SMI generated from the decoy register, the central processing unit (CPU) of the computer executes an interrupt service routine to configure various peripheral devices for low-power operation. After configuring the peripheral devices, the CPU transfers the contents of the decoy register (PM1*b* ), including the true sleep code, into the sleep register (PM1*a* ). The sleep register preferably resides in a South bridge device that controls the ACPI power states of the computer system based on the sleep type code (i.e., the sleep type bits) stored in the sleep register. Hence, transferring the sleep request from the decoy register to the sleep register puts the true sleep code into the sleep register, causing the South bridge to place the computer into a sleep mode. Because the CPU configures the peripheral devices before the system enters sleep mode, the peripherals perform as intended even while asleep, even if the power management software cannot configure the devices. At the same time, the computer system fully compiles with power transition requests from the operating system, albeit after a slight delay.

Thus, the present invention comprises a combination of features and advantages that enable it to substantially advance the art by providing a computer system that complies with software-based power management while still permitting hardware-based power management of some devices within the system. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of preferred embodiments is considered in conjunction with the following drawings, in which.

DETAILED DESCRIPTION OF THE PREFERRED EMBODIMENTS

Figure 2:
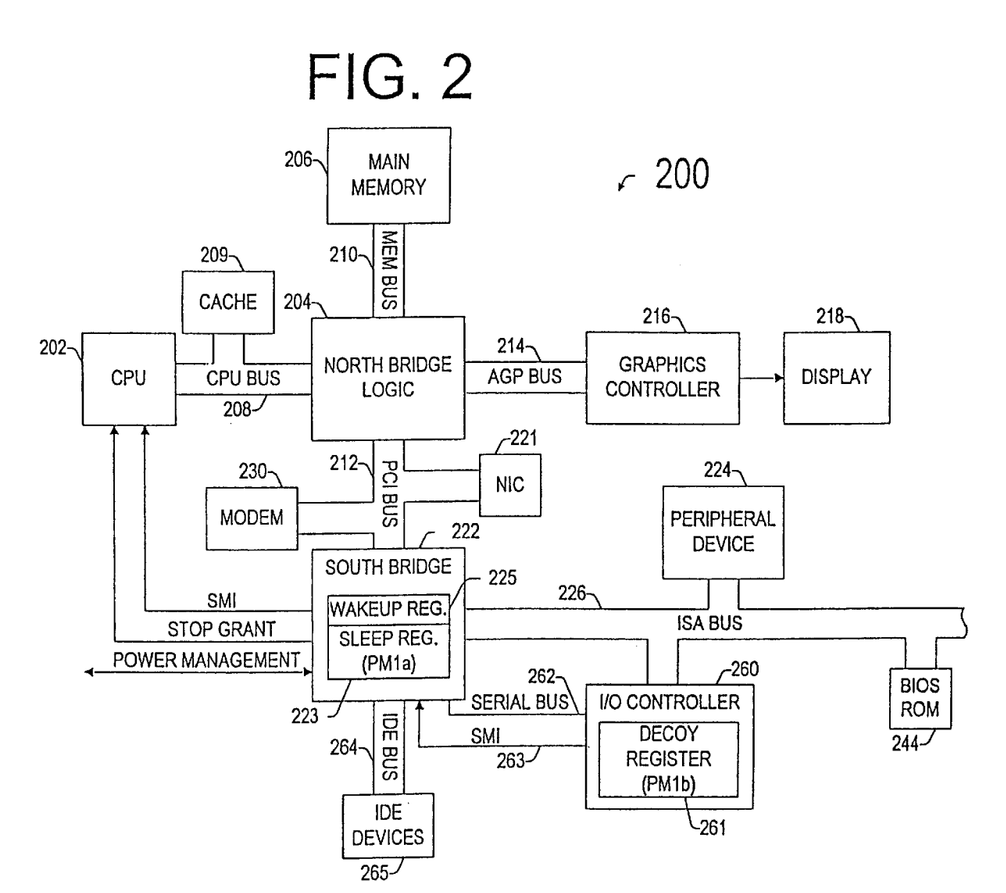
FIG. 2 illustrates a personal computer system constructed in accordance with a preferred embodiment of the invention.

Referring now to FIG. 2, a computer system 200 constructed in accordance with a preferred embodiment generally includes a central processing unit (or "CPU") 202 coupled to a variety of system components through an integrated bridge logic (or "North bridge") unit 204. It should be understood, however, that alternative embodiments may include any number of CPU's as desired. Computer system 200 may be configured in any number of ways, including as a laptop unit, a desktop unit, a network server, or any other configuration. The CPU 202 couples to the North bridge 204 via a CPU bus 208. An external cache memory unit 209 further may couple to the CPU bus 208 or directly to the CPU 202. As shown, a main memory 206 couples to the North bridge 204 through a memory bus 210, and a graphics controller 216 couples to the North bridge 204 through any suitable graphics bus 214, such as an Advanced Graphics Port (AGP) bus. A display device 218 couples to the graphics controller 216.

Referring still to FIG. 2, CPU 202 is illustrative of, for example, a Pentium® II microprocessor. It should be understood, however, that other alternative types of processors could be employed. Further, an embodiment of computer system 200 may include a multiple-CPU architecture with any number of processors coupled through the CPU bus 208 to the North bridge 204.

The main memory 206 generally includes a conventional memory device or array of memory devices in which application programs and data are stored. Computer system 200 includes any suitable type of memory such as dynamic random access memory (DRAM) or any of the various types of DRAM devices such as synchronous DRAM (SDRAM), extended data output (EDO) DRAM, or Rambus™ DRAM (RDRAM).

Referring still to FIG. 2, the graphics controller 216 controls the rendering of text and images on display 218. Graphics controller 216 may embody a typical graphics accelerator generally known in the art to render three-dimensional data structures on display 218. These data structures can be effectively shifted into and out of main memory 206, The graphics controller 216 therefore may assert mastership of the AGP bus 214 in that it can request and receive access to a target interface within the North bridge 204 to thereby obtain access to main memory 206. A dedicated graphics bus accommodates rapid retrieval of data from main memory 206. For certain operations, graphics controller 216 may further be configured to generate PCI protocol transactions on the AGP bus 214. The AGP interface of bridge logic 204 may thus include functionality to support both AGP protocol transactions as well as PCI protocol target and initiator transactions. Display 218 is any electronic display device capable of representing images or text. A suitable display 218 may include, for example, a cathode ray tube (CRT), a liquid display (LCD), a virtual retinal display (VRD), a thin film transistor display (TFT), or any other type of suitable display device for a computer system.

Additionally, one or more expansion devices couple to the North bridge 204 through a primary expansion bus 212. In the preferred embodiment, the primary expansion bus 212 comprises a Peripheral Component Interconnect (PCI) bus, and the expansion devices thus comprise PCI devices. It should be understood, however, that computer system 200 may incorporate any suitable expansion bus, network system, or communications channel and may comprise a physical or wireless architecture as desired. Other PCI devices include modem a 230 and a Network Interface Card (NIC) 221. In a preferred embodiment, at least one of the expansion devices provides an interface to a suitable communications line. The modem 230, for instance, provides an interface to a telephone, ISDN, or cable television line, while the NIC 221 interfaces a computer network communications line.

Computer system 200 further includes a secondary bridge logic unit 222 that provides an electrical interface to one or more peripheral devices by way of a secondary expansion bus 226. The secondary expansion bus 226 may be implemented using any suitable bus type such as an Industry Standard Architecture (ISA) bus or an Extended Industry Standard Architecture bus (EISA). As the preferred embodiment of FIG. 2 shows, expansion bus 226 is implemented as an ISA bus and, accordingly, peripheral device 224 represents an ISA device such as a fax/modem or sound card. The ISA device 224 may also include any of a variety of peripheral devices such as, for example, video accelerators, audio cards, hard or floppy disk drives, Small Computer Systems Interface (SCSI) adapters, and telephony cards.

As shown in FIG. 2, the South bridge logic 222 preferably accommodates a sleep register 223 constructed and organized in accordance with the PM1 Control Registers Fixed Feature Control Bits, as defined in Table 4–11 of the ACPI Specification, Revision 1.1, Section 4.7.3.2.1. Table I, below, illustrates the organization of the sleep register 223.

TABLE I

Sleep Register.

| Bit | Name | Description |
| --- | --- | --- |
| 0 | SCI_EN | When this bit is set, power management events generate SCI interrupts. When this bit is cleared, power management events generate SMI interrupts. |

TABLE I-continued

Sleep Register.

| Bit | Name | Description |
|---|---|---|
| 1 | BM_RLD | When set, this bit indicates that a processor within the computer system can wake up a sleeping processor via a bus master request. |
| 2 | GBL_RLS | Bit is set by the OS to generate an SMI to pass execution control to the BIOS. |
| 3–8 | Reserved | Reserved. |
| 9 | Ignore | Software ignores this bit. |
| 10–12 | SLP_TYP | Defines the type of sleeping state the system enters when the SLP_EN bit is set to one. |
| 13 | SLP_EN | Bit is set to cause the system to enter the sleep mode associated with the SLP_TYP bits. |
| 14–15 | Reserved | Reserved. |

As shown in Table I, Bits 0, 1, and 2 of the sleep register 223 hold the SCI_EN, BM_RLD, and GBL_RLS bits. Bits 10, 11, and 12 hold the SLP_TYP bits, including SLP_TYP1, SLP_TYP2, and SLP_TYP3, respectively. In accordance with the ACPI Specification, Bits 3–8 and 14–15 are reserved, and Bit 9 is to be ignored by the operating system. The sleep register 223 preferably comprises a single, sixteen-bit register, but may be implemented using a plurality of registers. As explained above, when the SLP_EN bit is set, or "asserted," to logic one, the South bridge 222 places the computer system 200 into one of the power modes S0–S5. The three SLP_TYP bits define which low-power mode the computer enters when the SLP_EN bit is asserted.

South bridge logic 222 preferably accommodates a wakeup register 225 constructed and organized in accordance with the PM1 Status Registers Fixed Feature Status Bits, as defined in Table 4–9 of the ACPI Specification, Revision 1.1, Section 4.7.3.1.1. Table II, below, illustrates the organization of the wakeup register 225.

TABLE II

Wakeup Register

| Bit | Name | Description |
|---|---|---|
| 0 | TMR_STS | Bit is set when the most significant bit of the timer changes. |
| 1–3 | Reserved | Reserved. |
| 4 | BM_STS | Bit is set when a system bus master requests the system bus. |
| 5 | GLB_STS | Bit is set when BIOS transmits a system control interrupt (SCI). |
| 6–7 | Reserved | Reserved. |
| 8 | PWRBTN_STS | Bit is set when the power button is pressed. |
| 9 | SLPBTN_STS | Bit is set when the sleep button is pressed. |
| 10 | RTC_STS | Bit is set when the real time clock (RTC) generates an alarm. |
| 11 | Ignore | Software ignores this bit. |
| 12–14 | Reserved | Reserved. |
| 15 | WAK_STS | Bit is set when the system is in the sleeping state and a wakeup event occurs. |

As shown in Table II, Bit 0 of the wakeup register 225 holds the TMR_STS bit, Bit 4 holds the BM_STS bit, Bit 5 holds the GBL_STS bit, Bit 8 holds the PWRBTN_STS bit, Bit 9 holds the SLPBTN_STS bit, Bit 10 holds the RTC_STS bit, and Bit 15 holds the WAK_STS bit. In accordance with the ACPI Specification, Bits 1–3, 6–7, and 12–14 are reserved, and Bit 11 is to be ignored by the operating system. The wakeup register 225 preferably comprises a single, sixteen-bit register, but may be implemented using a plurality of registers. The WAK_STS bit is set to logic one after the South bridge 222 wakes the computer system 200 from a low-power mode S1–S5.

In addition to providing an interface to an ISA or EISA bus, secondary bridge 222 may incorporate other functionality, as desired. For example, in one embodiment, secondary bridge 222 includes a master PCI arbiter (not shown) for arbitrating ownership of the PCI bus 212, and a disk drive controller (not shown). South bridge 222 also may interface an IDE bus 264 capable of supporting a variety of peripherals 265 such as one or more hard disk drives, floppy disk drives, CD ROM drives, or DVD drives.

In a preferred embodiment, South bridge 222 includes an interrupt controller (not shown) that transmits system management interrupt (SMI) signals to the CPU 202. Interrupts generally indicate that the sender of the interrupt needs the attention of the CPU 202. SMI's represent the highest-priority interrupts transmitted during normal computer operation and are transparent to the operating system. South bridge 222 may generate SMI's internally or may receive SMI's from various components within the computer system 200. If multiple SMI's are received simultaneously, the South bridge interrupt controller transmits the highest priority interrupt to the CPU 202. The CPU 202 then queries the South bridge 222 for an interrupt vector that defines a memory location within the computer system 200 associated with the source of the transmitted interrupt. The memory location identified in the interrupt vector represents the beginning instruction of an interrupt service routine (ISR), a set of instructions that the CPU 202 follows to respond to the SMI. Upon receiving an SMI, the CPU 202 immediately halts execution to run the ISR, resuming execution only after servicing the interrupt. The CPU 202 may also handle other types of interrupts in a similar fashion, including system control interrupts (SCI's).

Still referring to FIG. 2, the expansion bug 226 preferably interfaces a BIOS ROM 244. The BIOS ROM 244 stores instruction routines that the computer system 200 uses for basic input/output operations, such as writing data to the display 218, accessing storage devices on the IDE bus 264, and initializing the computer 200 during startup. Such instruction routines include interrupt service routines that the CPU 202 executes after receiving an interrupt signal.

To permit the computer 200 to implement ACPI power management features, the BIOS ROM 244 also stores an ACPI table defining the ACPI register locations and PM1a–b Control Register sleep codes. In accordance with the ACPI protocol, the operating system software reads the ACPI table from the BIOS ROM 244 during system startup. The ACPI register table defines the locations of the PM1a and PM1b Control Registers by specifying their logical addresses within the computer system 200. The operating system, running under ACPI, writes sleep requests to the PM1a and PM1b Control Registers to place the computer 200 into sleep mode. Each sleep request includes a sleep enable (SLP_EN) bit that initiates the sleep transition, and a sleep code. The sleep code comprises a plurality of sleep type (SLP_TYP) bits that specify an ACPI power state (S0–S5). In a conventional computer system, for instance, the BIOS ROM 244 might define the PM1a Control Register to be the sleep register 223, since the South bridge 222 responds to sleep requests, if the SLP_EN bit is asserted, by placing the computer in the low-power mode defined by the SLP_TYP bits. In a preferred embodiment, an ACPI table stored in BIOS ROM 244 defines the PM1a Control Register to be sleep register 223. In addition, the ACPI table defines the PM1b Control Register to be the decoy register 261.

In a preferred embodiment, each of the PM1a sleep codes, which define the sleep type (SLP_TYP) bits for each of the possible sleep states (S0–S5) transmitted to the PM1a Control Register during a sleep request, have the same value. The value corresponds to a normal operating mode and preferably represents the S0 state. Accordingly, power transition requests written to the PM1a register by the operating system will have no effect on the computer system 200, since the computer system 200 will be operating in normal mode when the request is placed. The PM1b sleep codes, on the other hand, uniquely identify each of the six different power states (S0–S5). The sleep type bits in the PM1b register thus represent the correct sleep state requested by the operating system.

If desired, the PM1a sleep codes may be defined as different values, keeping in mind that the values should correspond to normal modes of operation or to codes that have little or no effect on the current power state of the system at the time of the request. Further, some or all of the PM1b codes may share a common value, depending on the particular power management protocols that are implemented.

In a preferred embodiment, an I/O controller 260 couples to the ISA bus 226 and directly interfaces the South bridge logic 222 via a SERIAL BUS 262 and an SMI bus 263. The I/O controller 260 is typical of the LPC47B34x series of devices manufactured by Standard Microsystems, Inc., although the I1O controller 260 shown in FIG. 2 may include additional features. The I/O controller 260 preferably includes a keyboard and mouse controller (not shown) as well as a counter or a Real Time Clock (RTC) (not shown). In addition, the I/O controller 260 may receive signals from a variety of buttons mounted on the computer chassis (not shown), including a power button, a sleep button, and any other desired buttons or switches. The I/O controller 260 preferably is capable of transmitting SMI's to the South bridge interrupt controller via the SMI bus 263. After receiving an SMI from the I/O controller 260, the South bridge SMI controller forwards the SMI to the CPU 202, which services the interrupt according to the interrupt vector associated with the SMI.

Figure 3:
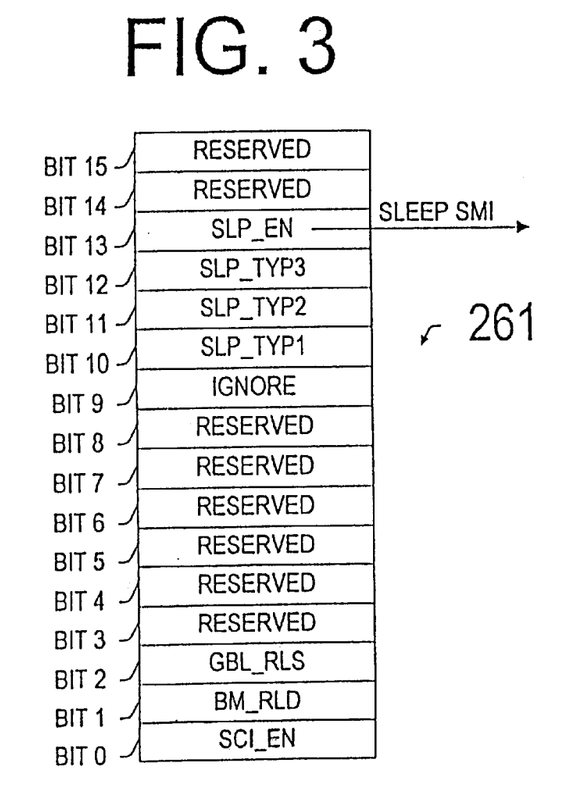
FIG. 3 illustrates a power management decoy register incorporated into the computer system of FIG. 2.

As shown in FIG. 2, the I/O controller 260 preferably includes a "decoy" register 261 that can be accessed via the ISA bus 226. FIG. 3 illustrates the decoy register 261 in greater detail. The decoy register 261 preferably comprises a single, sixteen-bit register, although a plurality of registers may be combined to perform the function of the register 261. In a preferred embodiment, the decoy register 261 is constructed and organized in substantially the same manner as the sleep register 223. Thus, Bits 0, 1, and 2 hold the SCI_EN, BM_RLD, and GBL_RLS bits, as described in Table II above. Bits 10, 11, and 12 hold the SLP_TYP bits, including SLP_TYP1, SLP_TYP2, and SLP_TYP3, respectively. In accordance with the ACPI Specification, Bits 3–8 and 14–15 are reserved, and Bit 9 is to be ignored by the operating system.

Referring to FIGS. 2 and 3, the decoy register 261 preferably is configured such that when the bit that holds the SLP_EN flag, or bit 13, is set to logic one, an interrupt generator (not specifically shown) within the I/O controller 260 transmits an SMI to the South bridge 222. The interrupt vector associated with the SMI identifies one or more instruction routines stored in the BIOS ROM 244 that, when executed, prepare selected peripheral devices for sleep mode operation. The interrupt generator thus serves to notify the computer system hardware that the operating system placed a power transition request.

Although the PM1b SLP_EN bit may reside at any desired location within the PM1b Control Register without departing from the principles of this disclosure, it preferably is located in the highest byte (8 bits) of the decoy register 261. Placing the SLP_EN bit in the highest byte of the register prevents the operating system from inadvertently triggering an SMI when writing data to the register using a byte-write scheme. Under a byte-write scheme, the operating system may store data into registers containing any number bytes by using a series of one-byte write commands, each of which fills one byte of the register at a time. During a series of one-byte writes, the operating system writes to the lower-order bytes first. Thus, if a bit that triggers an SMI is not located in the highest byte of a register, then a series of one-byte writes, which fills the lowest bytes in the register first, will trigger the SMI before filling the entire 16-bit register.

It should be noted that, for purposes of this disclosure and the accompanying claims, the term "highest byte" may be used flexibly to refer to the entire portion of a single-byte register, the higher of two bytes comprising a two-byte register, or the highest of all of the bytes comprising a register with three or more bytes. Hence, the term "highest byte" should be interpreted in context and should not be construed to imply or to preclude a particular number of bytes.

In response to an SMI from the SLP_EN bit, the particular configuration routines needed to prepare each peripheral device will depend on the particular peripheral devices chosen and will be well known to one of ordinary skill in the art. In a preferred embodiment, the BIOS ROM 244 includes instructions to configure both the modem 230 and the NIC 221 for low-power mode operation. The configuration instructions preferably prepare the modem 230 to wake the computer system 200 when a phone line rings and prepare the NIC 221 to wake the computer system 200 in response to wakeup messages received over a network. In alternative embodiments, however, the instructions may be designed to prepare any devices in the computer system 200 to operate under any desired power mode, and may or may not be directed specifically to the modem 230 and NIC 221. Further, the instructions may configure these devices in any desired manner, without departing from the principles of this disclosure.

Accordingly, the sleep register 223, the decoy register 261, the interrupt generator (not shown), and other power management circuitry within the South bridge (e.g., circuitry to assert the STOP GRANT and other POWER MANAGEMENT signals) form a power management circuit that permits the computer system to configure peripheral devices after the operating system submits a sleep request but before the computer actually goes to sleep. The power management circuit thus comprises a decentralized type of circuit, in which a collection of registers and other circuitry distributed throughout the system interact to perform the configuration and preparation needed for the various power management operations. In fact, the decoy register 261 and sleep register may be placed at any desired location within the computer system 200, without departing from the principles disclosed herein.

Figure 4:
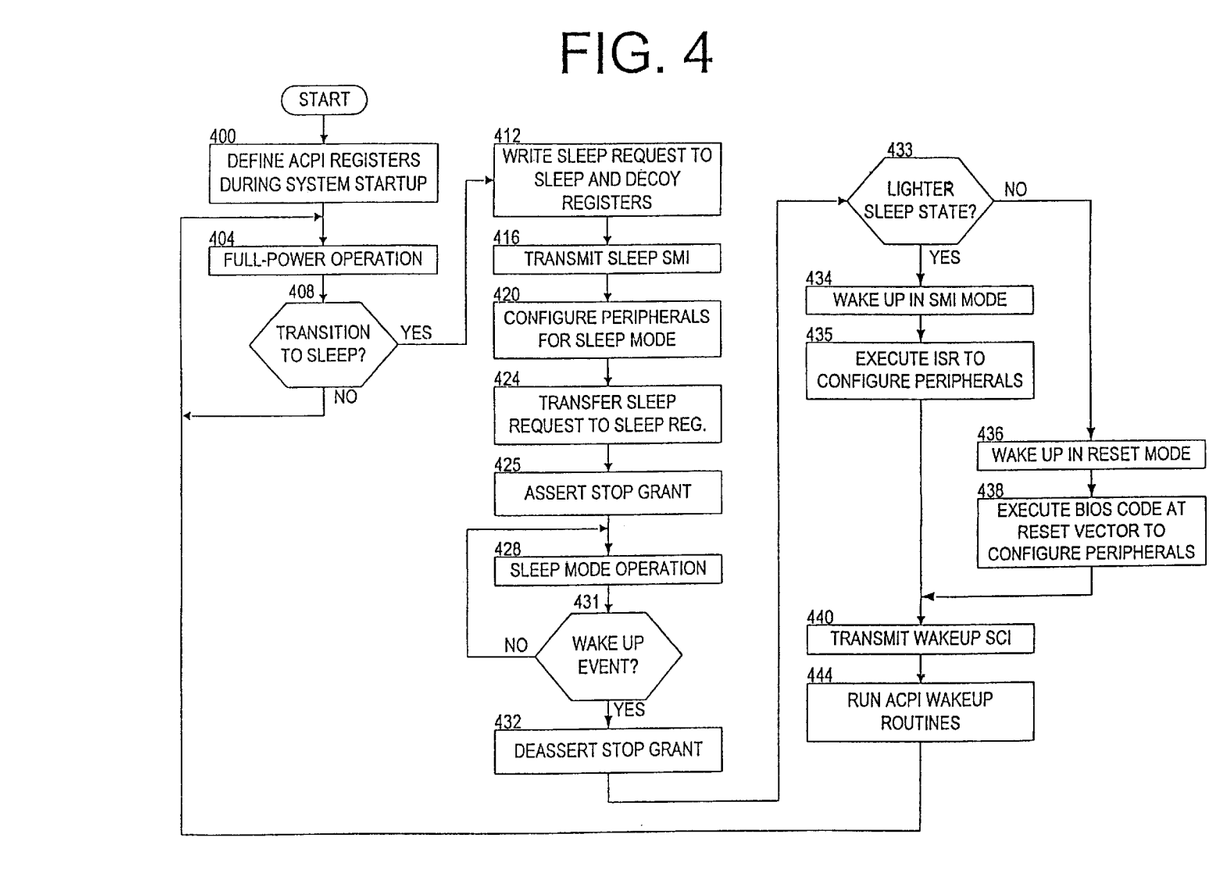
FIG. 4 is a flowchart representing the steps taken by the computer system of FIG. 2 to configure hardware peripheral devices when transitioning between full-power and low-power modes under ACPI power management.

FIG. 4 illustrates configuring peripheral devices prior to sleep mode. Block 400 illustrates the computer boot sequence, during which the operating system determines the ACPI register addresses and sleep type codes by reading the ACPI table. Accordingly, the addresses of sleep register 223 and 261 and decoy register provided to define the locations of the PM1a and PM1b Control Registers, respectively. The sleep type codes for the S0–S5 states are also provided to the operating system. Thus, the ACPI table includes a list of six codes representing the sleep states S0–S5 for the PM1*a* Control Register and a list of six codes representing the sleep states S0–S5 for the PM1*b* Control Register. The sleep codes associated with the PM1*b* register are unique and correspond to the same codes that the South bridge recognizes as representing the six sleep states S0–S5. The sleep codes associated with the PM1*a* Control Register, however, are all the same and preferably represent the code that the South bridge recognizes as the S0 code.

Block 404 of FIG. 4 represents full-power (or "normal") operation of the computer 200, which follows the startup sequence in block 400. Next, in block 408, control returns to block 404 as long as the operating system maintains full-power operation. The operating system may branch to block 412, however, to place the computer 200 into low-power mode. In accordance with the ACPI protocol, the operating system places the computer 200 in low-power mode by writing sleep requests to the PM1*a* and PM1*b* Control Registers.

The sleep request transmitted to sleep register 223 comprises the sleep code corresponding to the desired power state, as defined for the PM1*a* Control Register in the ACPI table. The sleep request also sets the PM1*a* SLP_EN bit in the sleep register 223. Because the ACPI table defines all six sleep codes for the PM1*a* register using the same value (the code representing the S0 power state), however, the South bridge will always interpret the sleep type bits in the sleep register 223 as a request to enter the S0 power state. Because the computer system is already in the S0 power state, the South bridge does not immediately react to the sleep request received into the sleep register 223.

Similarly, the sleep request also sets the PM1*b* SLP_EN bit in the decoy register 261. In contrast to the sleep request received by sleep register 223, however, the sleep request transmitted to the decoy register 261 carries the true sleep type code. The true sleep type code is the code that the South bridge interprets as representing the desired power state S0–S5. Accordingly, the true sleep type code preferably is unique for each power state.

Under conventional ACPI protocol, writing the SLP_TYP and SLP_EN bits to one of the PM1 Control Registers is expected to place the computer 200 into low-power mode immediately. Because the sleep register 223 places the computer in low-power mode, and not the decoy register 261, the computer system 200 actually does not enter the new power state immediately following block 412. Instead, changing the PM1*b* SLP_EN bit in the decoy register 261 causes the I/O controller 260 to transmit an SMI to the CPU 202 (block 416). The CPU 202 responds to the SMI by configuring the peripheral devices for low-power mode using the configuration instructions stored in the BIOS ROM 244 (block 420). In addition to preparing the peripheral devices for low-power mode, the configuration instructions preferably include one or more instructions that transfer the contents of the decoy register 261 into the sleep register 222 after the peripherals have been configured for low-power mode. Accordingly, the true sleep code is transferred in block 424 from the decoy register 261 to the sleep register 223. In response to the transfer in block 424, the South bridge 222 asserts the STOP GRANT signal (block 425) and places the computer system into the low-power mode defined by the SLP_TYP bits (block 428). Hence, the computer system 200 enters low-power mode in block 428 after the peripherals have been properly configured. The computer remains in low power mode in block 428 until a wakeup event occurs (block 432). A wakeup event might include, for example, the user pressing a button on the computer chassis or the modem 230 or NIC 221 waking the computer in response to an incoming message.

If a wakeup event occurs during block 431, the South bridge 222 wakes the computer system 200 in block 432, deasserting the STOP GRANT signal to restart the CPU 202. The computer system 200 then configures the peripheral devices for full-power mode. Although the exact operations for configuring the peripherals may be accomplished according to any desired protocol, the computer system 200 preferably executes block 436 depending on whether the sleep state in block 428 was a "lighter" sleep or a "deeper" sleep. A lighter sleep generally represents a sleep mode in which the system 200 has a higher level of activity (or "context"), such as state S1, while a deeper sleep state generally represents a sleep state that retain less system context, such as states S2–S5.

Because the CPU 202 was executing an ISR before sleep mode started in block 428, the computer system may wake up in SMI mode (block 434) if it is returning from a lighter sleep state, such as the S1 state. The CPU 202, in block 435, then continues executing the ISR associated with the sleep SMI that was transmitted prior to sleep mode, during block 416. The ISR instructions that are executed in block 435 configure the peripheral devices for full-power operation and also set the wake status bit in the wakeup register 225. When the wake status bit is set, the South bridge 222 transmits a system control interrupt (SCI) to the operating system to indicate the transition from sleep mode to full-power mode (block 440). The operating system then assumes control of the computer operation and may run a set of ACPI wakeup routines (block 444) before returning to normal operation in block 404.

If the sleep state of block 248 represents a deeper sleep state, corresponding to a state in which the computer system 200 does not retain enough context to continue operating in SMI mode at wakeup, then the CPU 202 will enter reset mode (block 436). In reset mode, the CPU 202 begins executing BIOS instructions to return the computer 200 to normal operation. The starting address of the BIOS instructions is called the reset vector, and the BIOS reset instructions preferably include routines to return the computer system 200 to normal operating mode. Use of the reset vector and BIOS reset code are well-known to those of ordinary skill in the art. In addition to simply returning the computer 200 to normal operation, however, the reset code preferably includes instructions to configure the peripheral devices for full-power operation (block 438). Accordingly, upon transmitting a wakeup SCI to the CPU 202 in block 440 and running any ACPI wakeup routines in block 444, the computer system 200 returns to normal operation in block 404 with the peripheral devices properly configured.

Accordingly, a personal computer system can use and configure legacy peripheral devices, even when running software-based power management, without foregoing important features that the legacy peripherals provide. The computer system utilizes both the PM1*a* Control Register (or "sleep" register) and the PM1*b* Control Register (or "decoy" register) to field ACPI sleep requests from the operating system. The sleep requests transmitted from the operating system to the sleep register, however, contain the sleep type bits that correspond to the S0 sleep state, so the computer system remains in normal operation immediately after the sleep request is transmitted. Upon receiving the sleep request, the decoy register initiates an SMI that causes the CPU 202 to configure the devices for sleep mode. The CPU 202 then transfers the contents of the decoy register to the sleep register. Because the sleep type bits in the decoy register hold the correct sleep code, the computer system then enters sleep mode, with peripheral devices properly configured.

To facilitate the proper sequence of operations, the ACPI register table stored in ROM gives each of the PM1*a* sleep codes either the same value or values that have minimal effect on the current ACPI power state. The value given to the PM1*a* codes preferably represents the S0 state, so that the computer system remains in normal operating mode immediately after the sleep request. The ACPI register table gives each of the PM1*b* sleep codes a sleep type value corresponding to the desired sleep state. In addition, the SMI is triggered when the sleep enable bit in the decoy register is asserted, initiating the legacy configuration sequences and finally transferring the true sleep code to the sleep register. As a result, the computer may configure legacy devices, or accomplish virtually any other task, between receiving and carrying out the sleep request.

Numerous variations and modifications will become apparent to those skilled in the art once the above disclosure is fully appreciated. It is intended that the following claims be interpreted to embrace all such variations and modifications.

I claim:

1. A method of configuring legacy peripheral devices in a computer system while running ACPI power management software whereby that places said computer system into sleep mode by writing sleep requests to ACPI PM1*a* and PM1*b* Control Registers, comprising:

locating a SLP_EN bit in the highest byte of said PM1*b* register;

configuring a peripheral device for sleep mode when said SLP_EN bit is set;

transferring the contents of said PM1*b* register into said PM1*a* register; and controlling the ACPI power mode according to the value in the PM1*a* register.

2. The method of claim 1 including defining the sleep type codes for said PM1*a* register to have the same value.

3. The method of claim 2 including using an ACPI table to define the sleep type codes.

4. The method of claim 3 wherein said same value represents the ACPI S0 power state.

5. The method of claim 1 including generating an interrupt when said SLP_EN bit is set.

6. The method of claim 5 wherein said interrupt initiates an interrupt service routine that configures said peripheral device and transfers the contents of said PM1*b* register.

7. The method of claim 6 wherein said peripheral device is capable of waking said computer from sleep mode.

8. The method of claim 7 wherein said interrupt comprises a system management interrupt.

9. The method of claim 8 wherein said peripheral device comprises a network interface card.

10. A method of controlling the power state of a computer system, comprising:

(a) writing a sleep request to a decoy register;

(b) configuring a hardware device within said computer system if an enable bit within the highest byte of said decoy register is set; and (c) writing the contents of said decoy register to a power management control register after configuring said hardware device.

11. The method of claim 10 including implementing the ACPI protocol in software, wherein (a) comprises retrieving an ACPI table during system startup, and wherein said ACPI table defines the ACPI PM1*b* Control Register to be said decoy register.

12. The method of claim 11 wherein the ACPI table defines the ACPI PM1*a* Control Register to be said control register.

13. The method of claim 12 including defining, in the ACPI table, ACPI sleep type codes for the PM1*a* Control Register such that all of said codes have the same value.

14. The method of claim 13 wherein said same value represents the S0 state.

15. The method of claim 12 wherein said bit comprises an ACPI SLP_EN bit.

16. The method of claim 10 wherein an interrupt initiates (b) and (c) if the power management software program sets said enable bit.

17. The method of claim 16 further comprising executing an interrupt service routine in response to the interrupt, the interrupt service routine including instructions to configure said hardware device for low-power operation.

18. The method of claim 17 wherein said interrupt service routine includes instructions to write the contents of said decoy register into said power management control register.

19. The method of claim 18 wherein the interrupt comprises an SMI.

20. The method of claim 10 wherein said hardware device comprises a modem.

21. A computer system, comprising:

a microprocessor;

a random access memory array coupled to said microprocessor;

a power management circuit coupled to said microprocessor and comprising a first register and a second register, the highest byte of said second register including an enable bit, wherein said power management circuit is capable of notifying said microprocessor when said enable bit becomes set;

wherein said microprocessor is configured to respond to the notification by writing the contents of said second register to said first register; and wherein said power management circuit is capable of determining the power state of said computer system based on the value in said second register.

22. The computer system of claim 21, further comprising:

a bus coupled to said microprocessor;

a peripheral device coupled to said bus; and wherein said microprocessor is capable of responding to the notification by configuring said peripheral device for a change in power state.

23. The computer system of claim 22 wherein said peripheral device is coupled to a communications line and configured to notify said power management circuit if a message is received over said communications line while said computer system is in low-power mode.

24. The computer system of claim 23 wherein said peripheral device comprises a modem.

25. The computer system of claim 23 wherein said power management circuit is capable of placing said microprocessor into low-power mode by asserting a STOP GRANT signal to said microprocessor, and wherein said power management circuit asserts the STOP GRANT signal if a code corresponding to low-power mode is written to said first register.

26. The computer system of claim 21 wherein said power management circuit is capable of notifying said microprocessor by transmitting an interrupt to said microprocessor.

27. The computer system of claim 21 wherein the interrupt comprises a system management interrupt.

28. The computer system of claim 21 wherein said microprocessor and said memory array are configured to run an operating system that implements power management control within said computer system.

29. The computer system of claim 28 wherein said operating system is capable of changing the power state of said computer system by writing a first code to said first register, writing a second code to said second register, and by asserting said enable bit.

30. The computer system of claim 29 wherein the first code represents normal operating mode and the second code specifies a low-power mode for said computer system.

31. The computer system of claim 30 wherein said operating system implements the ACPI protocol, wherein said first register comprises the ACPI PM1$a$ Control Register, said second register comprises the ACPI PM1$b$ Control Register, and said enable bit comprises the PM1 SLP_EN bit.

32. The computer system of claim 30 further comprising a BIOS ROM coupled to said microprocessor, wherein said BIOS ROM includes an ACPI table, and wherein said ACPI table specifies the same value for all sleep type codes written to the PM1$a$ Control Register.

33. The computer system of claim 32 wherein said operating system implements the ACPI protocol, wherein the ACPI table defines the PM1$a$ Control Register as said first register, and wherein said same value corresponds to the S0 power state.

34. A computer system that implements ACPI power management, comprising:

a microprocessor configured to run operating system software that executes ACPI routines;

a random access memory array coupled to said microprocessor;

an expansion bus coupled to said microprocessor and said memory array;

a bus bridge coupled to said expansion bus and to said microprocessor, said bus bridge comprising a first power management register, wherein said bus bridge is capable of controlling the power state of said computer system based on the value in said first register;

a second power management register coupled to said microprocessor, wherein the highest byte of said second register includes an enable bit;

an interrupt generator coupled to said second register and configured to transmit an interrupt to said microprocessor when said enable bit is set; and wherein said operating system is capable of writing power transition requests to said first and second registers, and wherein said microprocessor is configured to respond to the interrupt by writing the contents of said second register to said first register.

35. The computer system of claim 34, further comprising a peripheral device coupled to said expansion bus, wherein said microprocessor is configured to respond to the interrupt by preparing said peripheral device for a change in power state.

36. The computer system of claim 35 wherein said peripheral device is coupled to a communications line and is configured to notify said bus bridge if a message arrives over said communications line while said computer system is in low-power mode.

37. The computer system of claim 36 wherein said peripheral device comprises a network interface card.

38. The computer system of claim 36 wherein said interrupt comprises a system management interrupt.

39. The computer system of claim 36 wherein said bus bridge is capable of placing said microprocessor into low-power mode by asserting a STOP GRANT signal to said microprocessor, and wherein said bus bridge asserts the STOP GRANT signal if a code corresponding to low-power mode is written to said second register.

40. The computer system of claim 34 wherein said operating system is capable of changing the power state of said computer system by writing a first code to said first register, writing a second code to said second register, and by asserting said enable bit.

41. The computer system of claim 40 wherein the first code represents normal power mode and the second code specifies a low-power mode for said computer system.

42. The computer system of claim 41 wherein said operating system controls power management according to the ACPI protocol, and wherein said first register comprises the ACPI PM1$a$ Control Register, said second register comprises the ACPI PM1$b$ Control Register, and said enable bit comprises the PM1 SLP_EN bit.

43. The computer system of claim 41 including a BIOS ROM coupled to said bus bridge, wherein said BIOS ROM includes an ACPI table, and wherein said ACPI table specifies the same value for all power codes written to said first register.

44. The computer system of claim 43 wherein said same value represents the S0 power state.

45. A method for implementing ACPI power management in a computer system, comprising:

the step of defining all sleep type codes for the ACPI PM1$a$ Control Register in an ACPI table to correspond a normal operating mode;

the step of writing power transition requests to both the PM1$a$ and PM1$b$ Control Registers, whereby the PM1$b$ Control Register receives a sleep type code corresponding to an ACPI sleep mode;

the step of generating an interrupt if an enable bit in the highest byte of said PM1$b$ Control Register is set;

the step of configuring a peripheral device for sleep mode in response to the interrupt;

the step of transferring the contents of said PM1$b$ Control Register to said PM1$a$ Control Register after configuring said peripheral device for sleep mode; and the step of controlling the power mode of said computer system according to a sleep type code stored in the PM1$a$ Control Register.

46. A computer system, comprising:

a means for executing operating system instructions;

a means, coupled to said means for executing, for displaying video images;

a peripheral device, coupled to said means for executing, for providing a communications interface;

a means for determining the power state of said computer system, said means for determining coupled to said means for executing and including a means for storing said power state, said means for storing configured to receive power transition requests generated by said operating system instructions, wherein said means for determining controls the power state of said computer system based on the contents of said means for storing;

a register for receiving power transition requests, said register coupled to said means for executing, and wherein the highest byte of said register includes an enable bit;

a means for transmitting an interrupt to said means for executing when said enable bit is set; and wherein said means for executing, in response to receiving said interrupt, is capable of configuring said peripheral device for low-power mode and of transferring the contents of said register to said means for storing.

* * * * *